3,357,783
PROCESS FOR DYEING AND PRINTING POLYPROPYLENE FIBERS WITH MONOAZO DYESTUFFS
Hermann Wunderlich, Cologne-Mulheim, and Karl-Heinz Menzel, Leverkusen, Germany, assignors to Farbenfabriken Bayer Aktiengesellschaft, Leverkusen, Germany, a corporation of Germany
No Drawing. Filed Apr. 9, 1964, Ser. No. 358,660
Claims priority, application Germany, Apr. 20, 1963, F 39,532; Oct. 26, 1963, F 41,114
5 Claims. (Cl. 8—41)

The present invention relates to novel monoazo dyestuffs useful in the printing of polypropylene fibres. More particularly, the invention relates to new dyestuffs of the general class described which have been found to be useful for the dyeing and printing of polypropylene fibres, and yield particularly good results in the dyeing of metal-modified polypropylene fibres.

The present invention is based, in part, on our discovery that certain monoazo dyestuffs which are free from sulphonic acid and carboxylic acid groups, and are represented by the formula:

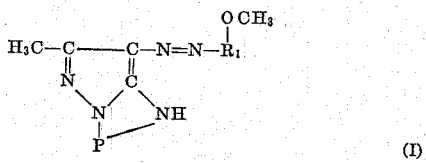

(I)

wherein R and $R_1$ represent aromatic-carboxylic radicals which may contain non-ionic substituents; $R_1$ represents the —$OCH_3$ group and is in the o-position to the azo grouping; and wherein in R the two N-atoms are in an adjacent position to each other.

The novel azo dyestuffs of the invention may be obtained if diazo compounds of amines of the formula:

are coupled in the 4-position, preferably in a neutral to acid medium with coupling components represented by the formula:

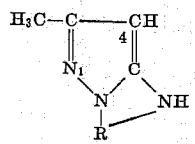

wherein the starting components are chosen of compounds free from sulphonic acid and carboxylic acid groups.

For purposes of building-up these monazo dyestuffs, diazo components of the benzene or naphthalene series are particularly suitable, and these contain, by definition, in the o-position to the diazotizable amino group a methoxy substituent. For example, the following compounds may be named as being illustrative of this type of compound, namely: 1-amino-2-methoxybenzene; 1-amino-2-methoxy-4- or -5-chloro- or -nitro-benzene; 1-amino-2,5-dimethoxybenzene; 1 - amino - 2 - methoxy - naphthalene; 1 - amino-2-methoxybenzene-4- or -5-sulphonamide and its N-substitution products.

As suitable coupling components useful in the process of the invention there may be mentioned, for example, among others, the pyrazolobenzimidazoles of the formula:

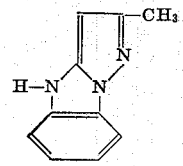

as well as derivatives of the same substituted at the benzene nucleus with, for example, halogen atoms.

As pointed out hereinabove, the novel dyestuffs of the invention are useful for the dyeing and printing of polypropylene fibres, and yield especially good results in the dyeing of metal-modified polypropylene fibres.

With respect to the terminology "metal-modified polypropylene fibres" it is to be understood that these include propylene fibres which contain a metal in the form of an inorganic salt, an organic metal compound or a complex compound. Of course, the fibres may contain, spun into the same, other additives, such as ultraviolet absorbers, stabilizers and the like.

In accordance with the process of the invention, the dyeing of polypropylene fibres is effected by applying a finely-dispersed dyestuff to the polypropylene fibres or fabrics as neutral, acid or alkaline aqueous suspensions using dispersing agents or emulsifiers, from a dyeing bath or a padding liquor, preferably at temperatures ranging from 50–130° C. In the case of pad-drying, intermediate drying at 70–90° C., followed by brief heating at 130° C. is expedient. At temperatures up to 100° C., it is generally advantageous to add to the dyeing bath conventional carrier substances, such as, trichlorobenzene, diphenyl, diphenyl ether, or esters of aromatic carboxylic acids. Suitable dispersing agents or emulsifiers which may advantageously be added to the dyestuffs are commercially available products such as, decomposition products of sulphite cellulose, condensation products of higher-alcohols and ethylene oxide, soaps, condensation polyglycol ethers of fatty acid amides, formaldehyde condensation products of aromatic sulphonic acids or mixtures of such compounds.

The dyestuffs of the invention which are barely soluble or insoluble in water are equally applicable to the dyeing of polypropylene fabrics via a printing process. Thus, the printing paste may be thickened with a customary thickener such as methyl cellulose, carob bean flour, industrial rubber or sodium alginate, and may otherwise contain the conventional additives for printing pastes including, for example, thiourea, thiodiglycol, among others, which are used for the application of water-insoluble dyestuffs, such as methylated alcohols, sodium-m-nitrobenzene sulphate or aqueous emulsions of sulphonated oils. In such application, the printing paste is suitably applied to the fabric by a printing block, spraying device, stencil, sieve or roller, after which the printed fabric is dried, and, if desired, steamed either at atmospheric pressure or in a closed container at raised pressure, if a temperature of 100° C., for example, as between 110–130° C. is required.

Following the dyeing or printing of the polypropylene fabrics, the colored materials may be after-treated in conventional manner, as for example, by treating the same with a hot aqueous soap solution and/or the solution of a suitable synthetic detergent.

The novel azodyestuffs of the invention rapidly dry onto the metal-containing polypropylene fibres, and the dyes and prints thus obtained are particularly distinguished by very good "fastness" properties. In addition, the dyed fabrics present very good resistance to dry cleaning, and their excellent resistance to rubbing, washing and light is noteworthy.

It is believed that the invention may be best understood by reference to the foregoing principles and procedures as applied to the following specific examples illustrating the application of the same to the dyeing of polypropylene fibres utilizing the novel compounds of the invention:

*Example 1*

5-nitro-2-aminoanisole, in amount of 7.3 grams, was initially dissolved in 20 milliliters of concentrated hydrochloric acid, and stirred for thirty (30) minutes. Ten to thirty (10–30) grams of ice were then added and the mixture was diazotized with 30 milliliters of a 10 percent nitrite solution at 0–5° C. Small amounts of excess nitrite were removed with an amido sulphonic acid solution.

To the foregoing diazo solution there was added at 0–5° C., within five minutes, a solution of 7.65 grams of 2-methyl-4H-pyrazolo [2,3-a]-benzimidazole (97%) in 30 milliliters of semi-concentrated hydrochloric acid. About 100 grams of ice were simultaneously added to the reaction mixture, and it was then buffered with a sodium hydroxide solution to a pH of 6.0.

The precipitated dyestuff may be represented by the following structural formula:

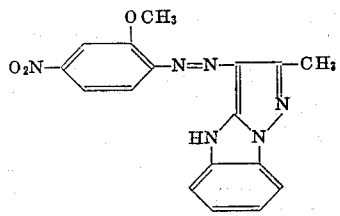

One hundred (100) grams of a combed polypropylene fibrous material were dyed in 2 liters of water, which was adjusted with dilute sulphuric acid to a pH of 4–5 and contained 4 grams of a weakly anion-active alkylphenyl polyglycol ether sulphate, with one gram of the finely-dispersed dyestuff produced according to the foregoing procedure (for one hour at 100° C.). The slightly-bluish red dyeing thus obtained was distinguished by very good fastness properties.

In terms of metal-modified polypropylene fibres, there were also used in the foregoing example such fibres which, in addition to containing ultraviolet absorbers and stabilizers, were spun with nickel phenolates of bis-(alkylphenol)-monosulphides.

When, in lieu of the diazo component of Example I, the diazo components of the following table were used, dyeings on metal-modified polypropylene fibres were obtained which also contained very good general fastness properties:

TABLE

| Diazo component: | Shade on modified polypropylene fibre |
|---|---|
| 5-chloro-2-aminoanisole | Orange. |
| 4-chloro-2-aminoanisole | Orange. |
| 5-chloro-2-amino-1,4-dimethoxybenzene | Orange. |
| 4-chloro-5-nitro-anisole | Red. |
| 4,5-dichloro-2-aminoanisole | Red. |
| 2-aminoanisole | Orange. |
| 2-aminophenetole | Orange. |
| 2-aminodiphenyl ether | Orange. |
| 2-amino-1,4-dimethoxybenzenes | Orange. |

What we claim is:

1. A process for dyeing and printing of polypropylene fibers which comprises treating polypropylene fibers with a dyestuff which is free of sulfonic acid groups and of carboxylic acid groups and has the general formula:

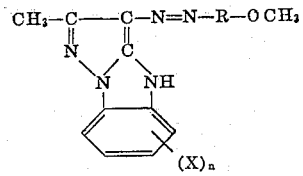

wherein R is an unsubstituted aromatic carboxylic radical or an aromatic carboxylic radical substituted with non-ionic substituent groups, the —OCH$_3$ being attached to R in the o-position with respect to the azo group; X is halogen; and $n$ is an integer from 0 to 4.

2. The process of claim 1 in which the dyestuff is applied from a dye bath maintained at a temperature of 50° C.–130° C. and containing dispersing agents or emulsifiers.

3. The process of claim 1 in which the dyestuff is applied from a padding liquor maintained at a temperature of 50° C.–130° C. and containing dispersing agents or emulsifiers.

4. The process of claim 1 in which the polypropylene fibers, prior to dyeing, are modified with metals or metal compounds.

5. The process of claim 4 in which said metals or metal compounds are selected from the group consisting of nickel, zinc, magnesium, copper, cobalt and the oxides, fatty acid salts, phenolates, dithiocarbamates, and triazoles of such metals.

References Cited

UNITED STATES PATENTS 3,167,537   1/1965   Menzel et al. _____ 260—157 X

NORMAN G. TORCHIN, *Primary Examiner.*

T. J. HERBERT, *Assistant Examiner.*

UNITED STATES PATENT OFFICE
CERTIFICATE OF CORRECTION

Patent No. 3,357,783 December 12, 1967

Hermann Wunderlich et al.

It is certified that error appears in the above identified patent and that said Letters Patent are hereby corrected as shown below:

Column 3, in the TABLE, between lines 3 and 4, insert -- 5-nitro-2-amino-1,4-dimethoxybenzene----------Red. --.

Signed and sealed this 29th day of July 1969.

(SEAL)
Attest:

Edward M. Fletcher, Jr.
Attesting Officer

WILLIAM E. SCHUYLER, JR.
Commissioner of Patents